United States Patent
Devassykutty et al.

(10) Patent No.: US 11,671,673 B2
(45) Date of Patent: Jun. 6, 2023

(54) SYSTEMS AND METHODS FOR FACILITATING NAVIGATION OF A MEDIA CONTENT GUIDE

(71) Applicant: Verizon Patent and Licensing Inc., Arlington, VA (US)

(72) Inventors: Benny Devassykutty, Lewisville, TX (US); Prasad Madhukar Kulkarni, Little Elm, TX (US); Ankush Raizada, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 12 days.

(21) Appl. No.: 16/906,717

(22) Filed: Jun. 19, 2020

(65) Prior Publication Data
US 2021/0400354 A1   Dec. 23, 2021

(51) Int. Cl.
| H04N 21/25  | (2011.01) |
| H04N 21/258 | (2011.01) |
| H04N 21/262 | (2011.01) |
| H04N 21/422 | (2011.01) |
| H04N 21/43  | (2011.01) |
| H04N 21/454 | (2011.01) |
| H04N 21/482 | (2011.01) |

(52) U.S. Cl.
CPC ....... *H04N 21/4821* (2013.01); *H04N 21/454* (2013.01); *H04N 21/4828* (2013.01)

(58) Field of Classification Search
None
See application file for complete search history.

(56) References Cited

U.S. PATENT DOCUMENTS

| 7,293,275    | B1 * | 11/2007 | Krieger   | H04N 21/4316 725/40  |
| 2008/0244659 | A1 * | 10/2008 | Stallings | H04N 21/47 725/39    |
| 2009/0164906 | A1 * | 6/2009  | Stallings | H04N 21/4821 715/730 |
| 2010/0162164 | A1 * | 6/2010  | Kwon      | H04N 7/17318 707/706 |
| 2014/0223481 | A1 * | 8/2014  | Fundament | H04N 21/4828 725/40  |
| 2016/0269677 | A1 * | 9/2016  | Lee       | H04N 7/0122          |

* cited by examiner

*Primary Examiner* — Brian T Pendleton
*Assistant Examiner* — Jean D Saint Cyr

(57) ABSTRACT

An exemplary method includes a media content system providing, for display in a media content search view, a media content guide pane including a portion of media content listings from a plurality of media content listings; providing a first media content search pane including a first set of options from which a first search parameter is configured to be used by the media content system to select which media content listings are presented in the media content guide pane; and providing, for concurrent display with the media content guide pane and the first media content search pane in the media content search view, a second media content search pane including a second set of options from which a second search parameter is configured to be used by the media content system to further select which media content listings are presented in the media content guide pane.

19 Claims, 11 Drawing Sheets

Fig. 7

TV Listings 8:12 PM

↶ WED 11/3 ↷     FILTER ALL

| | | | | |
|---|---|---|---|---|
| 504 CBS HD | CBS 8 News at 8 | Wheel of F... | M... | |
| 505 NBC HD | News 11 | Sportscast 11 | 8 Days a W... | B... |
| 511 USA HD | Downton Abbey | | The This Old H... | |
| | 8:00 PM TODAY 8:30 PM | | 9:00 PM | 9:30 |
| PBS 513 PBS WYNE | Clifford the Big Red Dog | | The This Old House Hou | |
| | Clifford the Big Red Dog | | | |
| | CAST Cree Summer, Gary LeRoi Gray, Grey... | | | |
| | SYNOPSIS When they discover Clifford is ... | | | |
| ion 533 TNT | Sports Beat | That 70's S... | The King of... | Xt... |
| ★ ON DEMAND | FEATURED Madagascar 3: Europe's Most Wa... | | | |
| TNT 533 TNT | Law & Order, SVU | | Behind-the ... | NA. |
| nick 551 NICK2 | Closing Bell | | Tinker Town | |

700, 702

- Subscribed
- My Favorites
  - Entertainment
  - Sports
  - News and Information
  - Religion
  - Marketplace
  - Digital Music
- Live
- HD 602, 704, 706

SYSTEMS AND METHODS FOR FACILITATING NAVIGATION OF A MEDIA CONTENT GUIDE

BACKGROUND INFORMATION

Media content guides are a useful tool for providing media content information to users of media content access devices. A user of a media content access device may utilize a media content guide to access information about available media content such as information indicating when the user's favorite media programs are scheduled for presentation and which media programming channels will carry the media programs.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 7 illustrates another exemplary media content search view according to principles described herein.

DETAILED DESCRIPTION OF PREFERRED EMBODIMENTS

Figure 1:
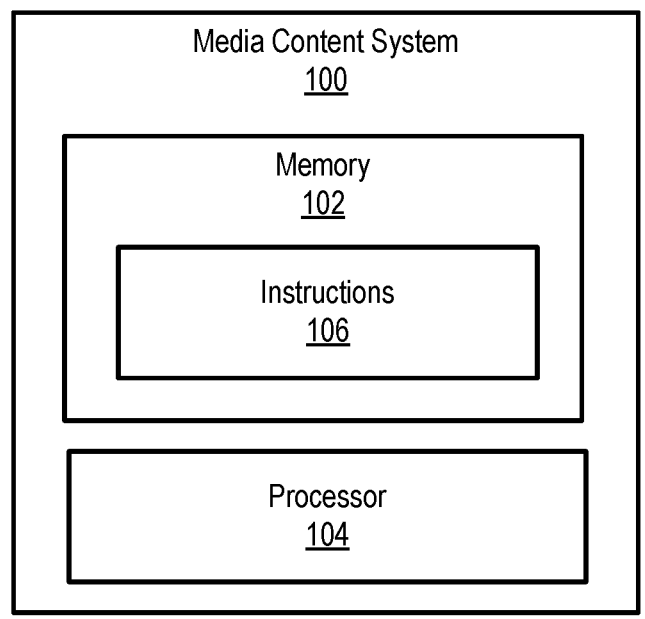
FIG. 1 illustrates an exemplary media content system according to principles described herein.

Systems and methods for facilitating navigation of a media content guide are described herein. For example, an exemplary media content system may provide a media content guide interface having elements configured to facilitate navigation of a media content guide.

In certain examples, for instance, an exemplary media content system may provide, for display by way of a display device in a media content search view, a media content guide pane including a portion of media content listings from a plurality of media content listings. The media content system may also provide, for concurrent display with the media content guide pane in the media content search view, a first media content search pane including a first set of options from which a first search parameter is configured to be selected by a user and used by the media content system to select which media content listings included in the plurality of media content listings are presented in the media content guide pane. The media content system may also provide, for concurrent display with the media content guide pane and the first media content search pane in the media content search view, a second media content search pane including a second set of options from which a second search parameter is configured to be selected by the user and used by the media content system to further select which media content listings included in the plurality of media content listings are presented in the media content guide pane. In certain examples, the first set of options may include a set of media categories, and the second set of options may include a set of filter options.

In certain examples, each pane in the media content search view may be navigable (e.g., in parallel directions) by a user providing user input to the media content system. A user selection of an option in the first and/or second media content search panes may cause faster navigation of the media content guide than is available when the user navigates within the media content guide pane. In certain examples, the media content guide pane is navigable in a direction, and the selection of an option in a media content search pane may cause faster navigation of the media content guide pane in that same direction than is available when the user navigates within the media content guide pane.

In certain examples, the media content search view may be provided for display in response to a user input provided while a media content guide view is provided for display. In such examples, the user input (e.g., a left directional arrow input) may be provided to facilitate searching the plurality of media content listings and may cause the media content guide view to be replaced by the media content search view. The user input may also facilitate navigation within the first media content search pane (e.g., by causing a selector window to be provided within the first media content search pane). In certain examples, a repeat of the same user input (e.g., another left directional arrow input) may facilitate navigation within the second media content search pane (e.g., by causing the selector window to be provided within the second media content search pane instead of the first media content search pane).

Various advantages and benefits are associated with the systems and methods for facilitating navigation of a media content guide described herein. For example, systems and methods such as those described herein may provide user interface elements that facilitate intuitive and/or efficient navigation of a media content guide by a user. The elements may be configured for intuitive and/or convenient access by the user such that the user may easily and quickly access media content navigation options (e.g., media content filters, media category search options, etc.) configured to facilitate searching and navigating media content listings. For example, the elements may be used by the user to efficiently narrow down media content listings represented in a media content guide. Moreover, filtering out irrelevant and/or undesired media content listings such that only relevant media and/or desired media content listings are displayed may beneficially result in a reduction in memory usage and/or processing that has to be performed (e.g., at the display level), thereby improving operation of a computing device (e.g., a media player device). These and other benefits that may be provided by systems and methods described herein will be evident from the disclosure that follows.

FIG. 1 illustrates an exemplary media content system 100 ("system 100"). As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device. In other examples, memory 102 and/or processor 104 may be distributed between multiple devices and/or multiple locations as may serve a particular implementation. An illustrative implementation of system 100 is described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store data representative of media content (e.g., one or more media programs, metadata, and/or other information related to the media programs) distributed by a media service, feature data associated with one or more features of the media service, and user data associated with one or more end users of the media service. In addition, memory 102 may also store any suitable data associated with categories of media content, filters that may be applied to search media content, graphical user interface content, and/or any other suitable data.

Processor 104 may be configured to perform (e.g., execute instructions 106 stored in memory 102 to perform) various processing operations associated with facilitating navigation of a media content guide. For example, processor 104 may provide, for display by way of a display device, a media content guide view and/or a media content search view such as any of the illustrative views described herein. Processor 104 may be configured to receive data representative of user input associated with such views and perform operations based on the user input, including operations to update the content in the display views. These and other operations that may be performed by processor 104 are described herein.

System 100 (e.g., processor 104) may be configured to provide any suitable service and/or feature that may be associated with media content as may serve a particular implementation. For example, system 100 may be configured to provide media content listing information, provide user interfaces configured to facilitate user interaction with a media service or feature (e.g., by providing graphical interfaces including one or more media content guides for display to a user), distribute (e.g., stream) media content for consumption by users of media content access devices (e.g., set-top boxes, laptop computers, smartphones, etc.), and/or provide any other suitable service and/or feature that may provide information regarding and/or access to media content.

As used herein, the term "media content" may refer to any form of media that may be referenced (e.g., in a media content guide) by and/or distributed (e.g., streamed) by system 100 and experienced by a user of system 100. Media content may include discrete instances of media, which may be referred to as media programs. The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may receive information about and/or access by way of system 100. Such media programs that are made available for user consumption by system 100 may be accessed and/or played back by an appropriately configured user computing device (e.g., a media player device) for presentation to the user.

A specific instance of a media program may be represented in a graphical user interface as a media content listing. As used herein, "a media content listing" may include any listing of a media program available to be experienced by way of a user computing device. A media content listing may include any suitable information associated with the particular media program represented by the media content listing. For example, a media content listing may include title information, cast information, duration information, cover art, a poster, a thumbnail image, a content rating, and/or any other suitable information associated with a media program. In certain examples, a media content listing may be included as one of a plurality of media content listings that are provided for concurrent display to a user in a media content guide. In such examples, the media content listings included in the plurality of media content listings may be representative of any suitable type or combination of types of media programs such as those described herein. For example, media content listings included in the plurality of media content listings may be representative of on-demand media programs that may be experienced by a user. Alternatively, the media content listings included in the plurality of media content listings may be arranged along a programming channel axis and a time axis to represent a transmission schedule for scheduled-type media content. In certain examples, the media content listings included in the plurality of media content listings may include a combination of both on-demand media content and scheduled-type media content. Exemplary media content listings are described herein.

Figure 2:
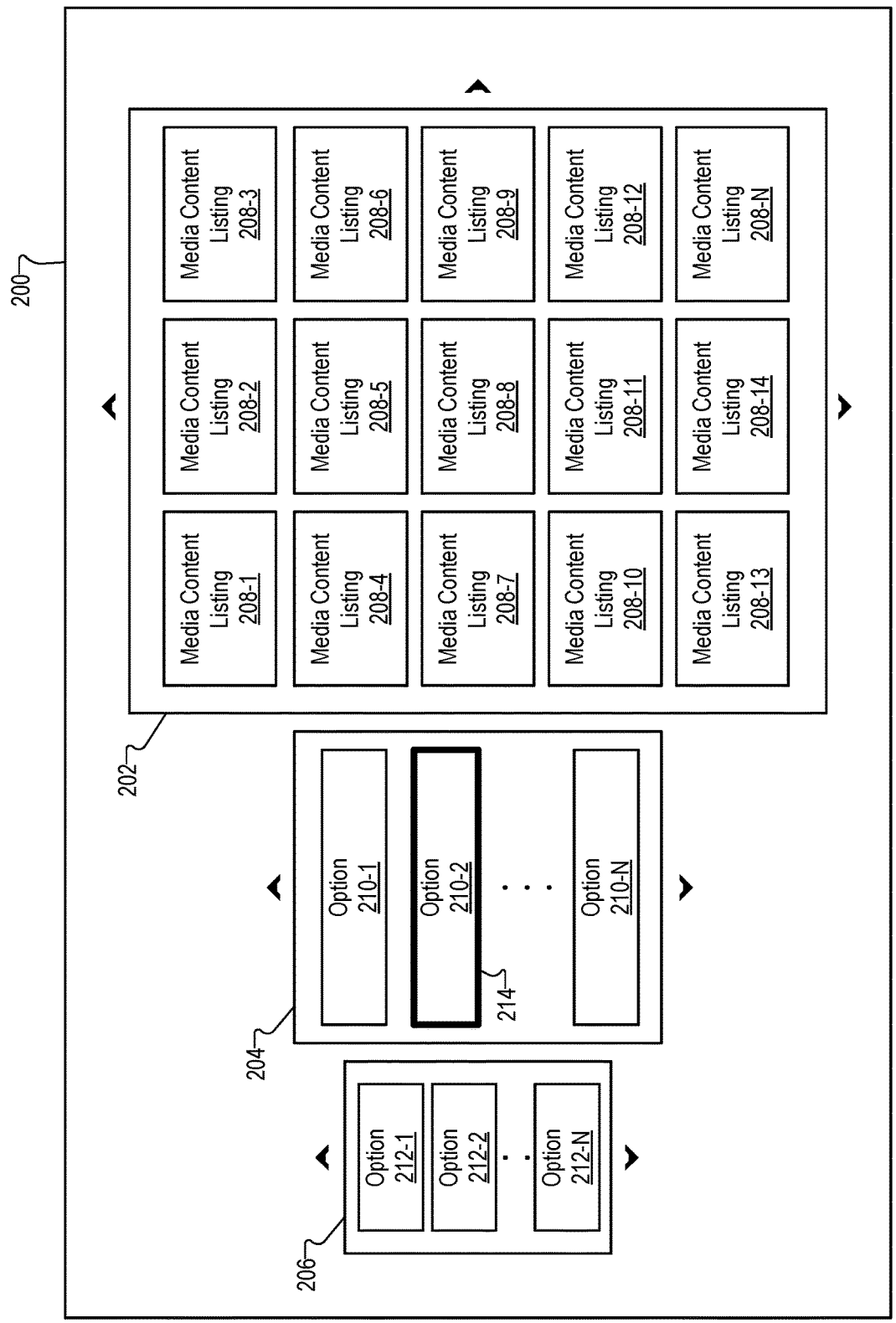
FIG. 2 illustrates an exemplary media content search view according to principles described herein.

FIG. 2 shows an exemplary media content search view 200 that may be provided for display by system 100 in certain implementations. System 100 may provide media content search view 200 for display by way of any suitable display device that may be associated with a user. For example, system 100 may provide media content search view 200 for display to a user by way of a television, a desktop computer, a laptop computer, a head mounted virtual reality display device, a tablet computer, a projector, a smartphone, and/or by way of any other suitable display device.

System 100 may provide media content search view 200 for display at any suitable time and in response to any suitable input. As will be described further herein, a user input with respect to a media content guide view may trigger system 100 providing media content search view 200 for display.

As shown in FIG. 2, media content search view 200 includes a media content guide pane 202, a first media content search pane 204, and a second media content search pane 206 that are provided for concurrent display with each other. In the example shown in FIG. 2, first media content search pane 204 and second media content search pane 206 are provided to the left of media content guide pane 202. However, first media content search pane 204 and second media content search pane 206 may be positioned on other sides of media content guide pane 202 in other implementations. For example, first media content search pane 204 and second media content search pane 206 may be positioned to the right of, below, or above media content guide pane 202 in certain alternative implementations.

As shown in FIG. 2, media content guide pane 202 includes a plurality of media content listings 208 (e.g., media content listings 208-1 through 208-N) representative of media programs that may be experienced by a user. Media content listings 208 may be represented in media content guide pane 202 in any suitable manner. In the example shown in FIG. 2, three columns of media content listings 208 are shown. However, more than three or less than three columns of media content listings 208 may be represented in media content guide pane 202 in certain implementations. For example, a single column of media content listings 208 may be represented in media content guide pane 202 in certain examples.

Media content listings 208 shown in FIG. 2 may represent a subset of a total number of media content listings 208 that may be available to be experienced by a user. For example, there may be hundreds or thousands or more media content listings 208 that could possibly be provided for display within media content guide pane 202. In view of this, only a subset of media content listings 208 may be displayed within media content guide pane 202 at a given time. Accordingly, system 100 may facilitate navigation within media content guide pane 202 such that a user may discover additional media content listings 208 not currently represented in media content guide pane 202. For example, system 100 may facilitate a user providing any suitable user input (e.g., an input by way of an up, down, left, or right directional arrow on a remote control device) to scroll media content guide pane 202 in either an upward direction, a downward direction, a left direction, or a right direction within media content search view 200. As the user navigates media content guide pane 202, additional media content listings 208 may come into view while some media content listings 208 move out of view. For example, a user may press an up arrow on a remote control device while navigating within media content guide pane 202. In response to the user pressing the up arrow, system 100 may cause the bottom row of media content listings (e.g., media content listings 208-13, 208-14, and 208-N) to move out of view and an new top row of media content listings to come into view in media content guide pane 202.

Due to the large number of media content listings 208 available to be represented within media content guide pane 202, navigating within media content guide pane 202 may be cumbersome and/or time consuming for a user. Accordingly, to facilitate search of media content listings 208, first media content search pane 204 includes a first set of options 210 (e.g., options 210-1 through 210-N) from which a first search parameter is configured to be selected by a user and/or system 100. System 100 may use the first search parameter to select which media content listings 208 included in a plurality of media content listings are presented in media content guide pane 202.

To further facilitate search of media content listings 208, second media content search pane 206 includes a second set of options 212 (e.g., option 212-1 through 212-N) from which a second search parameter is configured to be selected by a user and/or system 100. System 100 may use the second search parameter to further select which media content listings 208 included in the plurality of media content listings are presented in media content guide pane 202.

First set of options 210 and second set of options 212 may be associated with any suitable parameters and/or types of parameters that may facilitate system 100 selecting which media content listings 208 are provided for display within media content guide pane 202. For example, a parameter that may be used by system 100 to select media content listings 208 may correspond to a filter parameter, a category search parameter, a channel range search parameter, and/or any other suitable parameter.

In certain examples, there may be more options 210 included in the first set of options than may concurrently fit within first media content search pane 204. In such examples, system 100 may facilitate a user scrolling through options 210 within first media content search pane 204. This may be accomplished in any suitable manner. For example, as shown in FIG. 2, a user may provide any suitable user input to scroll options 210 either upwardly or downwardly within first media content search pane 204. Such scrolling may include one or more of options 210 moving out of view while one or more of options 210 move into view within first media content search pane 204.

Similarly, there may be more options 212 included in the second set of options than may concurrently fit within second media content search pane 206. In such examples, system 100 may facilitate a user scrolling through options 212 within second media content search pane 206. This may be accomplished in any suitable manner. For example, as shown in FIG. 2, a user may provide any suitable user input to scroll options 212 either upwardly or downwardly within second media content search pane 206. Such scrolling may include one or more of options 212 moving out of view while one or more of options 212 move into view within second media content search pane 206.

System 100 may facilitate a user selecting one or more options from the first set of options 210 and/or the second set of options 212 in any suitable manner. In certain examples, system 100 may provide a selector window that may be positioned within media content guide pane 202, first media content search pane 204, or second media content search pane 206. To illustrate, FIG. 2 shows includes a selector window 214 that is currently positioned at option 210-2. While selector window 214 is positioned at a particular option as shown in FIG. 2, a user may provide a user input to position selector window 214 at any particular option and select the particular option such that a search parameter associated with the particular option is applied to media content guide pane 202. For example, system 100 may detect any suitable user input while selector window 214 is on option 210-2 and, in response, apply a search parameter associated with option 210-2 to media content guide pane 202. In certain examples, system 100 may detect that the user pressed an enter button on a remote control device (e.g., on a directional pad of a remote control device) while selector window 214 is on option 210-2. In response to such a user input, system 100 may replace at least some of media content listings 208 currently shown in media content guide pane 202 with additional media content listings 208.

In certain examples, system 100 may automatically (e.g., without requiring additional input from a user) update media content listings 208 within media content guide pane 202 based on selector window 214 navigating to a different option 210 or 212 within media content search panes 204 and 206. For example, a user may provide any suitable user input to navigate selector window from option 210-2, as shown in FIG. 2, to option 210-1. In response, system 100 may automatically (e.g., without requiring the user to press an enter button) update media content listings 208 shown in media content guide pane 202 based on a search parameter associated with option 210-1.

In certain examples, system 100 may provide an indicator configured to inform a user regarding which of options 210 and/or 212 are currently selected. Such an indicator may be provided in any suitable manner. For example, system 100 may provide a check mark (not shown) for display adjacent to option 210-2 to indicate that particular option has be applied by system 100 to search media content listings 208.

Selection of one of options 210 and/or options 212 may cause faster navigation of media content guide pane 202 than is available when a user navigates within media content guide pane 202. The faster navigation may be in a first direction and may cause faster navigation in that direction in media content search view 200 than is available when a user navigates within media content guide pane 202. To illustrate an example, the first direction may correspond to a vertical direction such as an upward direction in media content guide pane 202. Due to the large number of media content listings 208 that may be available to be represented within media content guide pane 202, numerous user inputs (e.g., multiple presses of an upward directional arrow on a remote control device) may be required to navigate upward within media content guide pane 202 from the set of media content listings 208 currently shown in FIG. 2 to an additional set of media content listings 208 not currently shown in FIG. 2 but that may be of interest to a user. Selection of, for example, one of options 210 in first media content search pane 204 may cause media content guide pane 202 to shift, in that same direction, which media content listings 208 are represented in media content guide pane 202 such that the additional set of media content listings 208 are represented at least partially within media content guide pane 202. Additionally or alternatively, selection of one of options 210 in first media content search pane 204 may filter media content listings 208 so as to remove at least some of media content listings 208 that the user would have to navigate through in the upward direction to reach the additional set of media content listings 208. Accordingly, selection of options 210 may result in faster navigation of media content guide pane 202 in the upward direction by requiring relatively less user inputs to arrive at the additional set of media content listings 208 than if the user navigates within media content guide pane 202.

Selector window 214 may be movable between media content guide pane 202, first media content search pane 204, and second media content search pane 206 in any suitable manner. For example, a user may press a left directional arrow on a remote control device to move selector window 214 from first media content search pane 204 to one of options 212 (e.g., option 212-2) included in second media content search pane 206. Alternatively, the user may press a right directional arrow on the remote control device to move selector window 214 from first media content search pane 204 to media content guide pane 202. While selector window 214 is within media content guide pane 202 the user may navigate selector window 214 among media content listings 208 to select one of media content listings 208 for consumption. Alternatively, the user may press the left directional arrow again to move selector window 214 from media content guide pane 202 back to first media content search pane 204 and select a different option 210. In so doing, the user may be able to quickly and easily move between media content guide pane 202, first media content search pane 204, and second media content search pane 206 to facilitate searching media content listings 208 that may be provided for display within media content guide pane 202.

In certain examples, the position of selector window 214 may be fixed within a given pane shown in FIG. 2 when selector window 214 is moved into the given pane. For example, selector window 214 may be provided at a substantially central position within first media content search pane 204 when moved into first media content search pane 204, selector window 214 may be provided at a substantially central position within second media content search pane 206 when moved into second media content search pane 206, and selector window 214 may be provided at a substantially central position within media content guide pane 202 when moved into media content guide pane 202. In such examples, when selector window 214 is provided within first media content search pane 204, options 210 may be scrolled vertically within first media content search pane 204 to move different options 210 into and/or out of selector window 214. Similarly, when selector window 214 is provided within second media content search pane 206, options 212 may be scrolled vertically within second media content search pane 206 to move different options 212 into and/or out of selector window 214. In addition, when selector window 214 is provided within media content guide pane 202, media content listings 208 may be scrolled vertically and/or horizontally within media content guide pane 202 to move different media content listings 208 into and/or out of selector window 214.

In certain alternative implementations, a selector window such as selector window 214 may not be provided for display within a media content search view. For example, instead of providing selector window 214 for display in media content search view 200, system 100 may be configured to detect a touch input provided by a user with respect to one or more of options 210 and 212. In such examples, the user may scroll through additional options 210 or 212 by providing, for example, a touch input or a mouse click input on one of the arrows above or below first and second media content search panes 204 and 206. Alternatively, the user may scroll through additional options 210 or 212 by providing an upward or a downward swipe input. In addition, in such examples, the user may scroll through media content listings 208 within media content guide pane by providing a horizontal or vertical swipe input. Alternatively, the user may provide a touch input or a mouse click input with respect to the arrows provided above, below, and to the right of media content guide pane 202 to scroll through media content listings 208.

In certain examples, system 100 may continue to provide media content search view 200 for display while a user navigates within media content guide pane 202. For example, while the user provides one or more touch inputs, such as those described herein, to navigate within media content guide pane 202, system 100 may continue to provide first and second media content search panes 204 and 206 for display. Accordingly, the user may be able to see which of options 210 and/or 212 are applied to media content listings 208 while navigating within media content guide pane 202. Alternatively, when a user moves selector window 214 within media content guide pane 202, system 100 may provide a different graphical interface for display.

In certain implementations, system 100 may provide a media content guide view for display instead of media content search view 200 when a user begins navigating within media content guide pane 202. As used herein, a "media content guide view" may include any graphical user interface view that may include a plurality of media content listings arranged in a media content guide format. In such a media content guide view, the portion of media content listings from the plurality of media content listings may include any suitable type or combination of types media content listings, such as described herein, and may be arranged an any suitable manner. To illustrate an example, system 100 may provide a media content guide view for display when selector window 214 is moved into media content guide pane 202. Such a media content guide view may include media content listings 208, as changed based on user selection of any of options 210 and/or 212 if selected, but not first or second media content search panes 204 and 206. In such examples, system 100 may automatically transition from media content search view 200 to the media content guide view upon movement of selector window 214 into media content guide pane 202.

System 100 may provide a media content search view such as media content search view 200 for display at any suitable time and in response to any suitable input. For example, system 100 may provide a media content search view for display in response to a user input provided while a media content guide view is provided for display by system 100.

Figure 3:
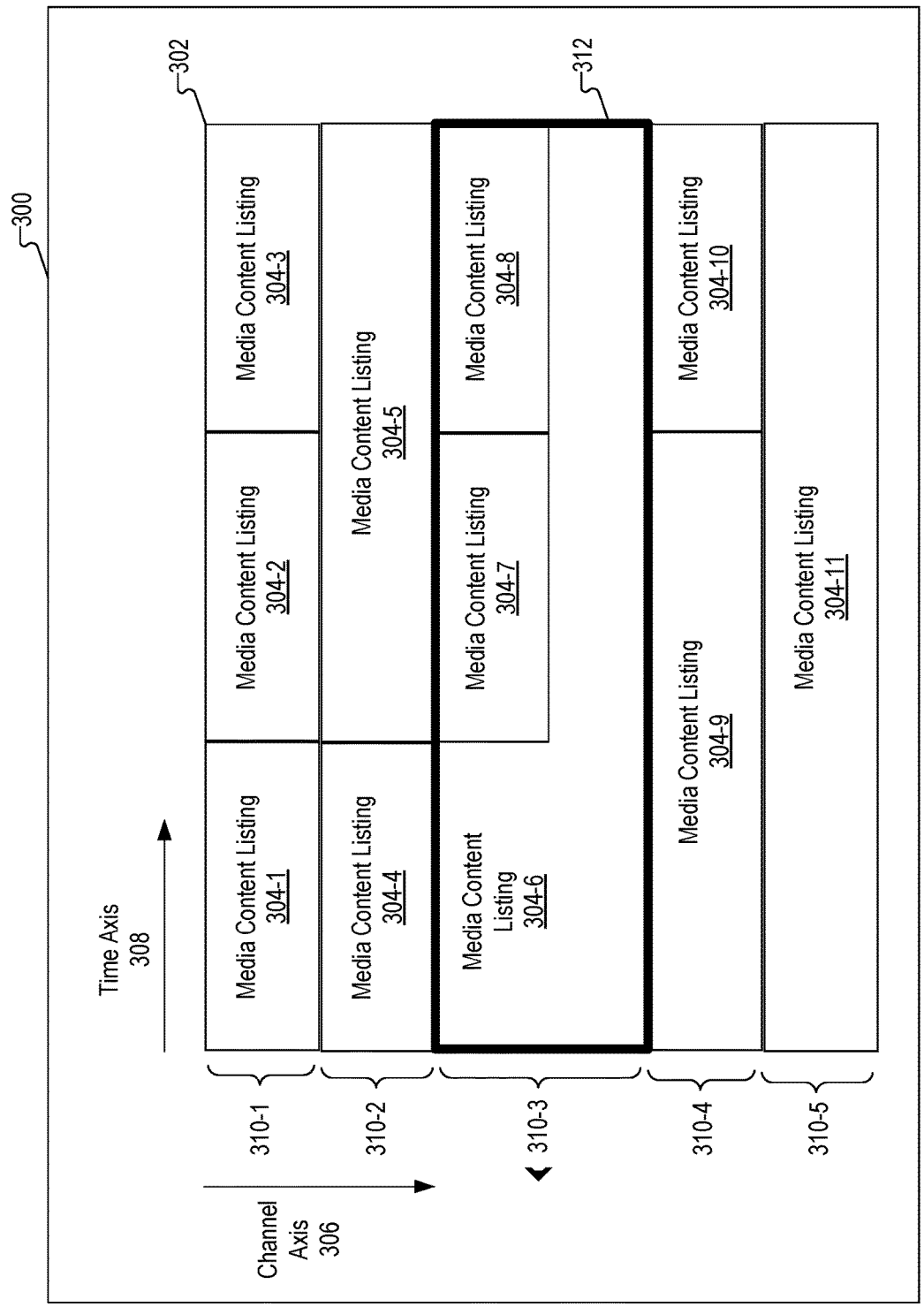
FIG. 3 illustrates an exemplary media content guide view according to principles described herein.

FIG. 3 shows an exemplary media content guide view 300 ("guide view 300") that includes graphical user interface content representing a media content guide. As shown in FIG. 3, guide view 300 includes a grid 302 of media content listings 304 (e.g., media content listings 304-1 through 304-11) representing media programs. Media content listings 304-1 through 304-11 shown in FIG. 3 may be considered to be a first set of media content instances.

In the illustrated example, grid 302 of media content listings 304 includes a two-dimensional matrix grid in which the media content listings 304 are positioned relative to a programming channel axis 306 and a time axis 308 to represent a transmission schedule for scheduled-type media content. Channel axis 306 may be oriented in a vertical direction as shown, with rows 310 (e.g., rows 310-1 through 310-5) representing different programming channels arranged along channel axis 306. Media content listings 304 may be positioned within rows 310 to visually indicate associations between programming channels and media content represented by media content listings 304.

As used herein, a "programming channel" may refer to any physical or virtual entity capable of being selected by a user to access media content associated with the programming channel. For example, a programming channel may include a television programming channel that may be selected by a user to access live television programming content associated with (e.g., distributed by way of) the television programming channel. As another example, a programming channel may be a virtual on-demand-type media content programming channel that may be selected by a user to access on-demand-type media content and/or information about on-demand-type media content associated with the channel. Thus, a programming channel may be associated with a particular type of media content, such as scheduled-type media content or on-demand-type media content.

Time axis 308 may be oriented in a horizontal direction as shown, and media content listings 304 may be arranged along time axis 308 to visually indicate associations between times along time axis 308 and timeslots of scheduled transmission times of scheduled-type media content represented by one or more of media content listings 304.

Guide view 300 further includes a selector window 312 positioned relative to grid 302 of media content listings 304 and usable to select a particular media content listing 304 included in grid 302 of media content listings 304. In FIG. 3, selector window 312 is positioned relative to grid 302 of media content listings 304 such that media content listing 304-6 is selected by selector window 312. System 100 may detect which of the media content listings 304 is currently selected by selector window 312 in any suitable way, such as based on the position of selector window 312 relative to grid 302 of media content listings 304.

System 100 may be configured to change the position of selector window 312 relative to grid 302 of media content listings 304 in response to any suitable user input, such as described herein. System 100 may change the position of selector window 312 relative to grid 302 of media content listings 304 in any suitable manner, such as by moving a position of selector window 312 and/or a position of grid 302 of media content listings 304 within guide view 300. In certain examples, the position of selector window 312 may be fixed within guide view 300 (e.g., at a substantially central position within guide view 300), and grid 302 of media content listings 304 may be scrolled vertically and/or horizontally within guide view 300 to move different media content listings 304 into and/or out of selector window 312.

In the example shown in FIG. 3, media content listing 304-6 is expanded in size relative to other media content listings 304 in guide view 300. This may be due to media content listing 304-6 currently being selected by selector window 312 or to the information provided with media content listing 304-6 being featured by system 100. The expanded size of media content listing 304-6 may provide additional room to provide information associated with the media program represented by media content listing 304-6.

While guide view 300 is provided for display, system 100 may detect a user input to access a media content search view to facilitate searching media content listings 304. System 100 may detect any suitable user input as a trigger to provide a media content search view for display to a user. For example, system 100 may be configured to detect a touch input, a voice command input, a remote control input (e.g., a directional arrow input, a joystick input, etc.), and/or any other suitable type of input or combination of inputs. To illustrate, while guide view 300 is provided for display, system 100 may detect that a user has pressed a left directional arrow on a remote control device.

In response to system 100 detecting a user input, system 100 may replace guide view 300 with a media content search view. This may be accomplished in any suitable manner. For example, in certain implementations, system 100 may shift grid 302 of media content listings 304 in a particular direction (e.g., to the left, to the right, etc.) within a graphical user interface displayed by a display device to make room for the media content search view.

Figure 4:
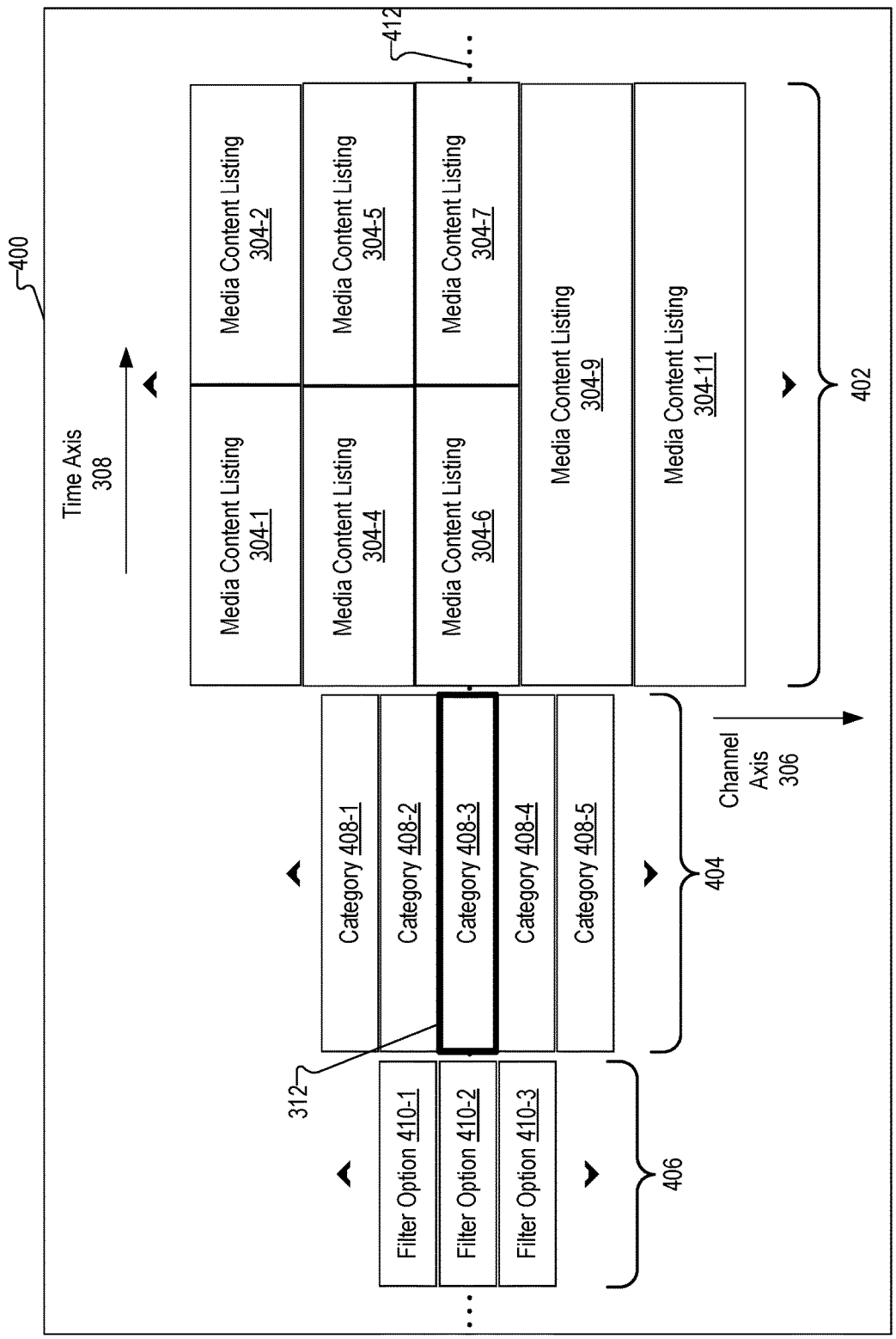
FIGS. 4-5 illustrate exemplary media content search views according to principles described herein.
Figure 5:
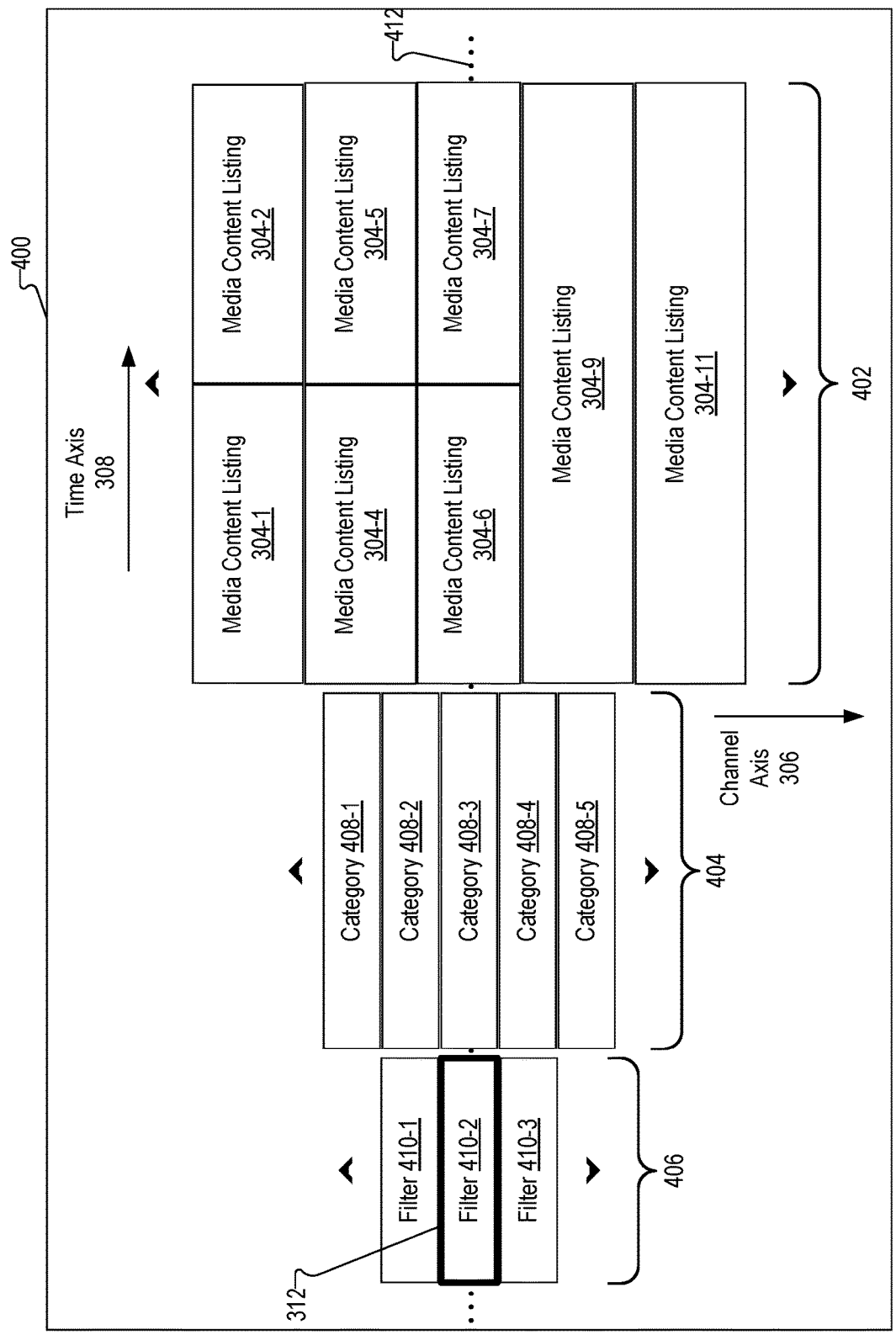

FIGS. 4 and 5 show an exemplary media content search view 400 that may be provided for display by system 100 in response to one or more user inputs. For example, a user may press a left directional arrow on a remote control device while viewing guide view 300. In response to such a user input, system 100 may provide media content search view 400 shown in FIG. 4 for display by way of a display device. The user may press the left directional arrow again while viewing media content search view 400 shown in FIG. 4. System 100 may detect that the user repeated the same user input and, in response, may provide media content search view 400 shown in FIG. 5 for display by way of the display device. Accordingly, a user may provide user input with respect to the views shown in FIGS. 3-5 to easily and quickly access media content search view 400 with minimal user inputs (e.g., with only one or two left directional arrow inputs provided on a remote control device) to facilitate the user searching media content listings 304.

As shown in FIG. 4, media content search view 400 includes a media content guide pane 402, a first media content search pane 404, and a second media content search pane 406. In the example shown in FIG. 4, media content guide pane 402 includes a second set of media content listings 304 (e.g., media content listings 304-1, 304-2, 304-5, 304-6, 304-7, 304-9, and 304-11). In the example shown in FIG. 4, the second set of media content listings 304 is different from the first set of media content listings 304 shown in FIG. 3. In such an example, the number of media content listings in media content guide pane 402 may be less than the number of media content listings in guide view 300 to make room for media content search panes 404 and 406 within media content search view 400. This may be accomplished in any suitable manner. For example, to make room for media content search panes 404 and 406, certain media content listings 304 on the right side of media content guide pane 402 may be omitted or clipped. In certain alternative implementations, the same set of media content listings 304 from guide view 300 may at least initially be provided for display within media content guide pane 402. In such examples, the size of media content listings 304 may be reduced to make room for first and second media content search panes 404 and 406.

In the example shown in FIG. 4, first media content search pane 404 includes a set of media categories 408 (e.g., categories 408-1 through 408-5) from which a media category is configured to be selected by a user and used by system 100 to select a set of media content listings 304 associated with the media category for presentation in media content guide pane 402. Categories 408 may include any suitable category or type of category that may be useful to facilitate searching media content listings 304. For example, categories 408 may include sports, news, religion, entertainment, music, marketplace, music, genres of media programs, and/or any other suitable category.

As shown in FIG. 4, selector window 312 is provided in first media content search pane 404 instead of media content guide pane 402. While selector window 312 is in first media content search pane 404, a user may select one of categories 408 in any suitable manner, such as described herein. In response to such a selection, system 100 may update media content guide pane 402 to include at least some media content listings 304 in the selected category. For example, category 408-3 may be associated with a news channel category. In response to a user selecting category 408-3, system 100 may replace, for example, media content listings 304-1, 304-2, etc. with additional media content listings 304 that are in the news channel category.

After or prior to a user selecting one of media categories 408, the user may provide any suitable user input to move selector window 312 to second media content search pane 406. For example, the user may press the left directional arrow on the remote control device again while viewing media content search view 400 to shift selector window 312 to second media content search pane 406, as shown in FIG. 5.

Second media content search pane 406 includes a set of filter options 410 (e.g., filter options 410-1 through 410-3) from which a filter parameter is configured to be selected by a user and used by system 100 to select a filtered set of media content listings for presentation in media content guide pane 402. Filter options 410 may include or otherwise be associated with any suitable filter parameter that may be used to filter media content listings 304. For example, filter parameters may include a favorites filter parameter, a resolution filter parameter such as a high-definition ("HD") filter parameter, a subscribed filter parameter, a live filter parameter, and/or any other suitable filter parameter. One or more of filter options 410 may be selected by a user in addition to or as an alternative to categories 408 to facilitate system 100 selecting which media content listings 304 to provide for display in media content guide pane 402.

While selector window 312 is provided within second media content search pane 406, the user may select one or more of filter options 410 to apply a filter parameter to media content listings 304. In response to such a selection, system 100 may replace at least some of media content listings 304 within media content guide pane 402 with a filtered set of media content listings 304.

In certain examples, a filtered set of media content listings may comprise a set of media content listings associated with a media category as filtered based on a filter parameter. For example, system 100 may determine that a category 408 has been selected by a user that is associated with entertainment media content. In addition, system 100 may determine that a filter option 410 has been selected by the user that is associated with an HD filter parameter. Accordingly, in such an example, system 100 may update media content listings 304 shown in media content guide pane 402 to include a set of media content listings 304 that are associated with the entertainment category as filtered to include only HD media programs.

In the example shown in FIGS. 4 and 5, first media content search pane 404, second media content search pane 406, and media content guide pane 402 are provided horizontally adjacent to one another in media content search view 400. In addition, first media content search pane 404 including categories 408 is provided between media content guide pane 402 and second media content search pane 406 including filters 410. However, first and second media content search panes 404 and 406 and media content guide pane 402 may be arranged differently with respect to one another in other implementations. For example, in certain alternative implementations, second media content search pane 406 including filters 410 may be provided between media content guide pane 402 and first media content search pane 404 including categories 408.

In certain examples, the programming channels arranged along channel axis 306 in media content guide pane 402 may be arranged in blocks based on media categories. For example, a first block of programming channels (e.g., programming channels 1-20) in a media content guide may correspond to news channels, a second block of programming channels (e.g., programming channels 21-40) in a media content guide may correspond to sports channels, a third block of programming channels (e.g., programming channels 41-60) in a media content guide may correspond to entertainment channels, etc. In such examples, selection of a particular media category 408 may result in system 100 updating media content guide pane 402 so as to shift programming channels displayed along channel axis 306 in a particular direction to a block of programming channels associated with the selected media category. In so doing, at least some media content listings 304 associated with the selected media category may be provided for display in media content guide pane 402 instead of those currently shown in FIG. 4.

In certain examples, system 100 may automatically select a default position for a selector window within a media content search pane based on one or more media content listings currently represented in a media content guide pane. For example, media content listing 304-6 may represent a news program and category 408-2 may correspond to a news category. In such an example, system 100 may select category 408-2 as a default position for selector window 312 when selector window 312 moves from media content listing 304-6 to first media content search pane 404. In an alternative example, one or more of media content listings 304 currently shown in FIG. 4 may be included in a block of sports channels arranged along channel axis 306. In addition, category 408-1 may correspond to a sports category. Based on the block of sports channels being currently represented in media content guide pane 402, system 100 may select category 408-1 as a default position for selector window 312 when selector window 312 moves from media content guide pane 402 to first media content search pane 404.

In certain examples, when a selector window is moved into a media content search pane, system 100 may automatically scroll the media content search pane such the default position of the selector window and the selected option, category, or filter are provided at a central position within the media content search pane. For example, continuing with the example described above, based on the block of sports channels being currently represented in media content guide pane 402, system 100 may automatically scroll first media content search pane 404 such that category 408-1 and selector window 312 are provided at a central position within first media content search pane 404.

In certain examples, media content guide panes, first media content search panes, and second media content search panes, such as those described herein, may include content that is scrollable with respect to a common axis in a media content search view. For example, as shown in FIGS. 4 and 5, media content listings 304 in media content guide pane 402, the set of media categories 408 in first media content search pane 404, and filter options 410 in second media content search pane 406 may be scrollable with respect to a common axis 412 in media content search view 400. In the example shown in FIGS. 4 and 5, common axis 412 extends horizontally within media content search view 400 and bisects media content guide pane 402, first media content search pane 404, and second media content search pane 406. However, it is understood that such a common axis may be oriented differently in a media content search view in alternative implementations.

System 100 may animate the scrolling of media content guide panes, first media content search panes, and second media content search panes, such as those described herein, with respect to a common axis in any suitable manner. In certain examples, system 100 may represent the scrolling as a two-dimensional animation. In certain alternative examples, system 100 may represent the scrolling as a three-dimensional animation in which a particular media content search pane is depicted three-dimensionally as scrolling about the common axis.

In certain implementations, system 100 may be configured to replace search options within a media content search pane with relatively more narrow search options in response to a user selection of a search option within the media content search pane. To illustrate an example, category 408-1 in media content search pane 404 in FIG. 4 may correspond to a sports category. System 100 may detect any suitable user input selecting category 408-1. In response to the user input, system 100 may update media content guide pane 402 to include one or more media content listings associated with sports. In addition, in response to the user input, system 100 may replace categories 408-1 through 408-5 with additional relatively more narrow categories associated with sports. For example, such additional categories may include types of sports (e.g., football, soccer, baseball, basketball, etc.) that may be selected by a user and used by system 100 to further select which media content listings are provided for display in the media content guide pane. Selection of one of the particular types of sports may result in system 100 updating media content guide pane 402 further to include at least some media content listings associated with the particular type of sport.

In certain alternative implementations, in response to a user input provided with respect to a media content guide view, system 100 may provide a media content search view for display that includes one or more media content search panes that include successively more narrow search options. System 100 may provide any suitable number of such media content search panes for display as may serve a particular implementation. For example, system 100 may detect a first user input while media content guide view 300 shown in FIG. 3 is provided for display. In response to the first user input, system 100 may provide a media content search view for display that includes a media content guide pane and a first media content search pane. The media content guide pane may include a portion of media content listings that may be configured in any suitable manner, such as described herein. The first media content search pane may include a first set of search options that may be used to select which media content listings are to be presented within the media content guide pane.

While such a media content search view is provided for display, system 100 may detect a second user input. In response to the second user input, system 100 may provide a second media content search pane for display concurrently with the first media content search pane and the media content guide pane. The second media content search pane may include a second set of search options. In certain examples, the second set of search options may be relatively more narrow than the first set of search options in the first media content search pane. For example, the second set of search options may be sub-menu options associated with one of the search options included in the first set of search options.

While the media content guide pane, the first media content search pane, and the second media content search pane are provided for display in the media content search view, system 100 may detect a third user input. In response to the third user input, system 100 may provide a third media content search pane for display concurrently with the first media content search pane, the second media content search pane, and the media content guide pane. The third media content search pane may include a third set of search options. In certain examples, the third set of search options may be relatively more narrow than the second set of search options in the first media content search pane.

System 100 may successively provide any suitable additional number of media content search panes for display as may serve a particular implementation. In certain examples, the first, second, and third user inputs may correspond to the same user input. For example, each of the first, second, and third user inputs may correspond to a left directional arrow input. In certain examples, the first set of options, the second set of options, and the third set of options may correspond, respectively, to a first set of filters, a second set of filters, and a third set of filters. In certain examples, the first set of filters, the second set of filters, and the third set of filters may be each be successively more narrow than the other.

To illustrate an example, system 100 may detect a first left directional arrow input while media content guide view 300 is provided for display. In response to the first left directional arrow input, system 100 may provide a media content search view for display that includes a media content guide pane and a first media content search pane that includes a first plurality of filter options including an entertainment filter option. While selector window 312 is positioned on the entertainment filter option, system 100 may detect a second left directional arrow input. In response to the second left directional arrow input, system 100 may provide a second media content search pane for display concurrently with the first media content search pane and the media content guide pane. The second media content search pane may include a second plurality of filter options that are relatively more narrow than the first plurality of filter options in the first media content search pane. For example, the second plurality of filter options may include relatively more narrow entertainment filter options such as a movie filter option, an episodic media program filter option, etc. While selector window 312 is positioned on, for example, a movie filter option from the second plurality of filter options, system 100 may detect a third left directional arrow input. In response to the third left directional arrow input, system 100 may provide a third media content search pane for display concurrently with the media content guide pane, the first media content search pane, and the second media content search pane. The third media content search pane may include a third plurality of filter options that are relatively more narrow than the movie filter option in the second media content search pane. For example, the third plurality of filter options may include filter options according to movie type (e.g., western, action, romance, comedy, etc.). In such an example, system 100 may filter the media content listings in the media content guide pane at any suitable time. For example, system 100 may update which media content listings are represented in the media content guide pane each time a user navigates to another media content search pane. Alternatively, system 100 may only update which media content listings are provided for display in the media content guide pane in response to a specific user selection of a filter option. For example, system 100 may only update the media content listings in the media content guide pane after a user navigates selector window 312 to the third media content search pane and specifically selects, in any suitable manner, a particular filter option (e.g., a western movie filter option) included in the third plurality of filter options.

Figure 6:
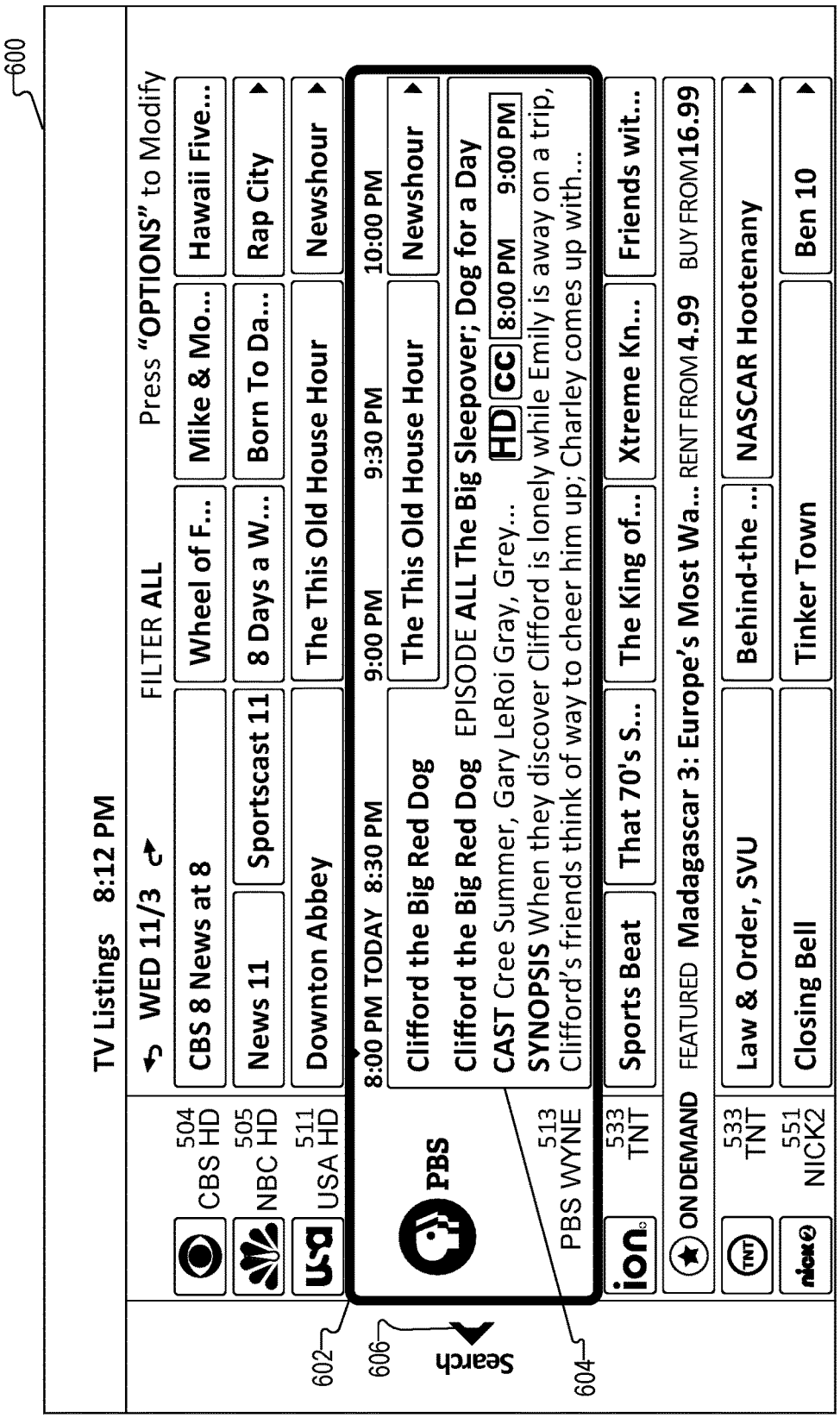
FIG. 6 illustrates another exemplary media content guide view according to principles described herein.

FIG. 6 illustrates a media content guide view 600 of a media content guide user interface according to a specific example in which a selector window 602 is positioned to select a particular media content listing 604 within a grid of cells representing media content in a media content guide. Media content listing 604 represents scheduled-type media content, which in this example is an episode of a television program titled "Clifford the Big Red Dog" that is scheduled to be transmitted by way of a specific programming channel (e.g., a programming channel labeled "PBS" and having programming channel number "513") during a specific timeslot (e.g., 8:00 PM-9:00 PM) on a specific date (e.g., November 3$^{rd}$), as visually indicated in media content guide view 600.

While media content guide view 600 is provided for display, a user may provide any suitable user input, such as described herein, to access a media content search view. For example, a user may touch arrow 606, press a left directional arrow on a remote control device, move a joy stick on a remote control device to the left, or provide any other suitable user input to access a media content search view. FIG. 7 shows an exemplary media content search view 700 that system 100 may provide for display in response to a user input provided with respect to media content guide view 600.

As shown in FIG. 7, media content search view 700 includes a media content guide pane 702, a first media content search pane 704, and a second media content search pane 706. Media content guide pane 702 includes a subset of the media content listings shown in FIG. 6 to make room for first and second media content search panes 704 and 706. In the specific example shown in FIG. 7, first media content search pane 704 includes user selectable sections labeled "Entertainment," "Sports," "News and Information," "Religion," "Marketplace," and "Digital Music," which may each correspond to different media categories that may be selected by a user and used by system 100 to select which media content listings to include in media content guide pane 702. Second media content search pane 706 includes user selectable sections labeled "Subscribed," "My Favorites," "Live," and "HD," which may correspond to filter options that may be selected by a user and used by system 100 to select a filtered set of media content listings to provide within media content guide view 702.

Media content search view 700 also includes selector window 602, which is currently provided on a "News and Information" section instead of the media content listing associated with "Clifford the Big Red Dog" as shown in FIG. 6. While selector window 602 is provided within first media content search pane 704, system 100 may detect a user selection of one of the identified categories and update which media content listings are represented in media content guide pane 702. Additionally or alternatively, system 100 may detect that a user has pressed a left directional arrow on a remote control device to move selector window 602 to second media content search pane 706. While selector window 602 is in first media content search pane 706, the user may select one or more of the filter options represented in second media content search pane 706. In response to such a selection, system 100 may filter which media content listings are represented in media content guide pane 702. To illustrate an example, while selector window 602 is within first media content search pane 704, the user may navigate selector window 602 to the "Sports" category by, for example, pressing an up directional arrow on a remote control device. The user may then press, for example, an enter button on a remote control device while selector window 602 is on the "Sports" category. In response to the user pressing the enter button, system 100 may update the media content listings represented in media content guide pane 702 to only include sports programs, or in some aspects, jump to a beginning portion of the range of sports channels. After system 100 updates the media content listings represented in media content guide pane 702, the user may press the left directional arrow on the remote control device to move selector window 602 to second media content search pane 706. The user may then navigate selector window 602 within second media content search pane 706 to select both the "Subscribed" filter and the "Live" filter. In response to such selections, system 100 may filter the sports programs represented in media content guide view 702 such that they only include live sports programs on program channels to which the user is currently subscribed. The user may then, for example, press a right directional arrow twice on the remote control device to easily and quickly return selector window 602 to media content guide pane 702. The user may then navigate selector window 602 in any suitable manner within media content guide pane 702 to select one of the live sports programs to consume.

Figure 8:
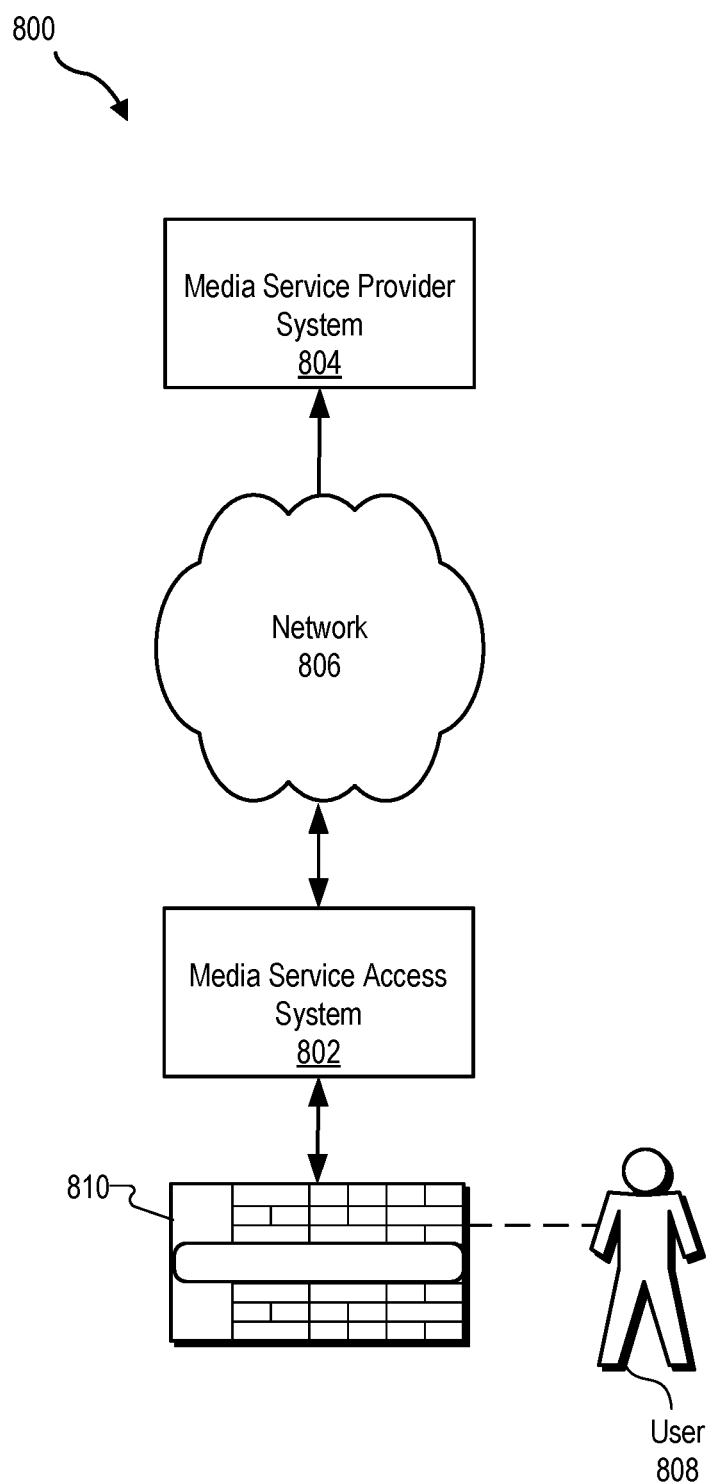
FIG. 8 illustrates an exemplary implementation of the media content system of FIG. 1 according to principles described herein.

System 100 may be implemented in any suitable manner as may serve a particular application. FIG. 8 illustrates an exemplary implementation 800 of system 100. As shown in FIG. 8, implementation 800 may include a media service access system 802 configured to communicate with a media service provider system 804 by way of a network 806. In implementation 800, memory 102 and processor 104 of system 100 may be implemented by access media service access system 802, media service provider system 804, or distributed across access media service access system 802 and media service provider system 804.

Media service provider system 804 and media service access system 802 may communicate using any communication platforms and technologies suitable for transporting data and/or communication signals, including known communication technologies, devices, media, and protocols supportive of remote communications, examples of which include, but are not limited to, data transmission media, communications devices, and data transmission protocols.

Network 806 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, live television transmission networks, and any other networks capable of carrying media content, data, and/or communications signals between media service access system 802 and media service provider system 804. Communications between media service access system 802 and media service provider system 804 may be transported using any one of the above-listed networks, or any combination or sub-combination of the above-listed networks. Alternatively, media service access system 802 and media service provider system 804 may communicate in another way such as by one or more direct connections between media service access system 802 and media service provider system 804.

Media service provider system 804 may include one or more server-side computing devices. Media service access system 802 may include one or more media content computing/processing devices (e.g., a set-top-box device, DVR device, television, gaming console, personal media player, media server, home media network gateway device, tablet computer, mobile device, smartphone, etc.) capable of accessing and presenting media content for experiencing by a user 808 (e.g., an end user of a media service) using the device(s).

Media service provider system 804 and/or media service access system 802 may be configured to perform one or more operations to provide a media content guide user interface 810 for display and use by user 808. Media content guide user interface 810 may be configured to display any suitable user interface view, such as those described herein, and may be displayed by way of any suitable display device accessible to user 808, including on a display screen of the display device included in media service access system 802 or communicatively connected to media service access system 802.

Media service access system 802 may access media content listings and/or information associated with media content listings from media service provider system 804 in any suitable manner. In certain examples, media service access system 802 may download and locally store all of the media content listings available for display within media content guide views and/or media content search views such as those described herein. For example, media service access system 802 may download and locally store all of the media content listings associated with on-demand media content available for consumption by user 808. Additionally or alternatively, media service access system 802 may download all of the media content listings associated with scheduled-type media content available within a certain time period (e.g., a week). In such examples, media service access system 802 may perform the filtering and/or sorting of the locally stored media content listings based on one or more user inputs provided with respect to media content search panes such as those described herein. Such filtering by media service access system 802 may result in media service access system 802 consuming less memory and/or using less graphics processing unit (GPU) cycles due to the relatively smaller data presentation.

In certain alternative examples, filtering and/or sorting of media content listings may be performed by media service provider system 804 instead of media service access system 802. In such examples, only a portion of the available media content listings may be stored locally by media service access system 802 at a given time. For example, media service access system 802 may notify media service provider system 804 regarding a selection of an option (e.g., an option in a media content search pane) to be used to by media service provider system 804 to select which media content listings to send to media service access system 802. In response to the selected option, media service provider system 804 may, for example, filter the media content listings stored by media service provider system 804 and provide a filtered set of media content listings to media service access system 802. In so doing, it is possible to reduce network/server load and/or improve operation of media service access system 802 because relatively less data has to be transmitted to media service access system 802 and the processing requirements associated with filtering media content listings may be performed by media service provider system 804 instead of media service access system 802.

Figure 9:
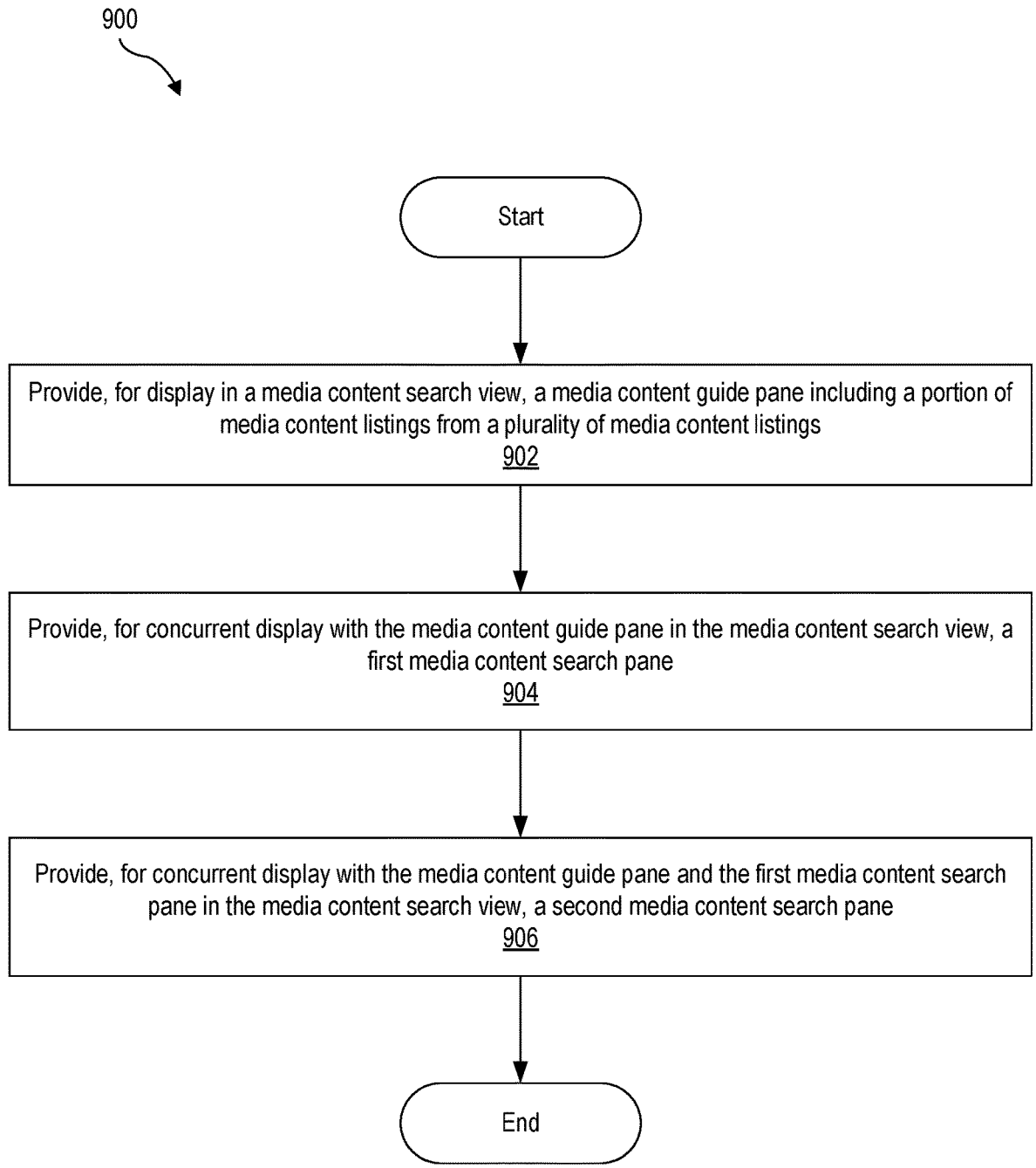
FIGS. 9-10 illustrate exemplary methods for facilitating navigation of a media content guide according to principles described herein.

FIG. 9 illustrates an exemplary method for facilitating navigation of a media content guide. While FIG. 9 illustrates exemplary operations according to one embodiment, other embodiments may omit, add to, reorder, and/or modify any of the operations shown in FIG. 9. One or more of the operations shown in FIG. 9 may be performed by system 100, any components included therein, and/or any implementation thereof.

In operation 902, a media content system (e.g., media content system 100) may provide, for display in a media content search view, a media content guide pane including a portion of media content listings from a plurality of media content listings. Operation 902 may be performed in any of the ways described herein.

In operation 904, the media content system may provide, for concurrent display with the media content guide pane in the media content search view, a first media content search pane. The first media content search pane may include any suitable content such as described herein. For example, the first media content search pane may include a set of media categories from which a media category is configured to be selected by a user and used by the media content system to select, from the plurality of media content listings, a set of media content listings associated with the media category for presentation in the media content guide pane. Operation 904 may be performed in any of the ways described herein.

In operation 906, the media content system may provide, for concurrent display with the media content guide pane and the first media content search pane in the media content search view, a second media content search pane. The second media content search pane may include any suitable content such as described herein. For example, the second media content search pane may include a set of filter options from which a filter parameter is configured to be selected by the user and used by the media content system to select a filtered set of media content listings for presentation in the media content guide pane. Operation 906 may be performed in any of the ways described herein. As described herein, the media content guide pane may be navigable in a first direction in the media content search view. In addition, selection of the media category in the first media content search pane may cause faster navigation of the media content guide pane in the first direction than is available when the user navigates within the media content guide pane.

Figure 10:
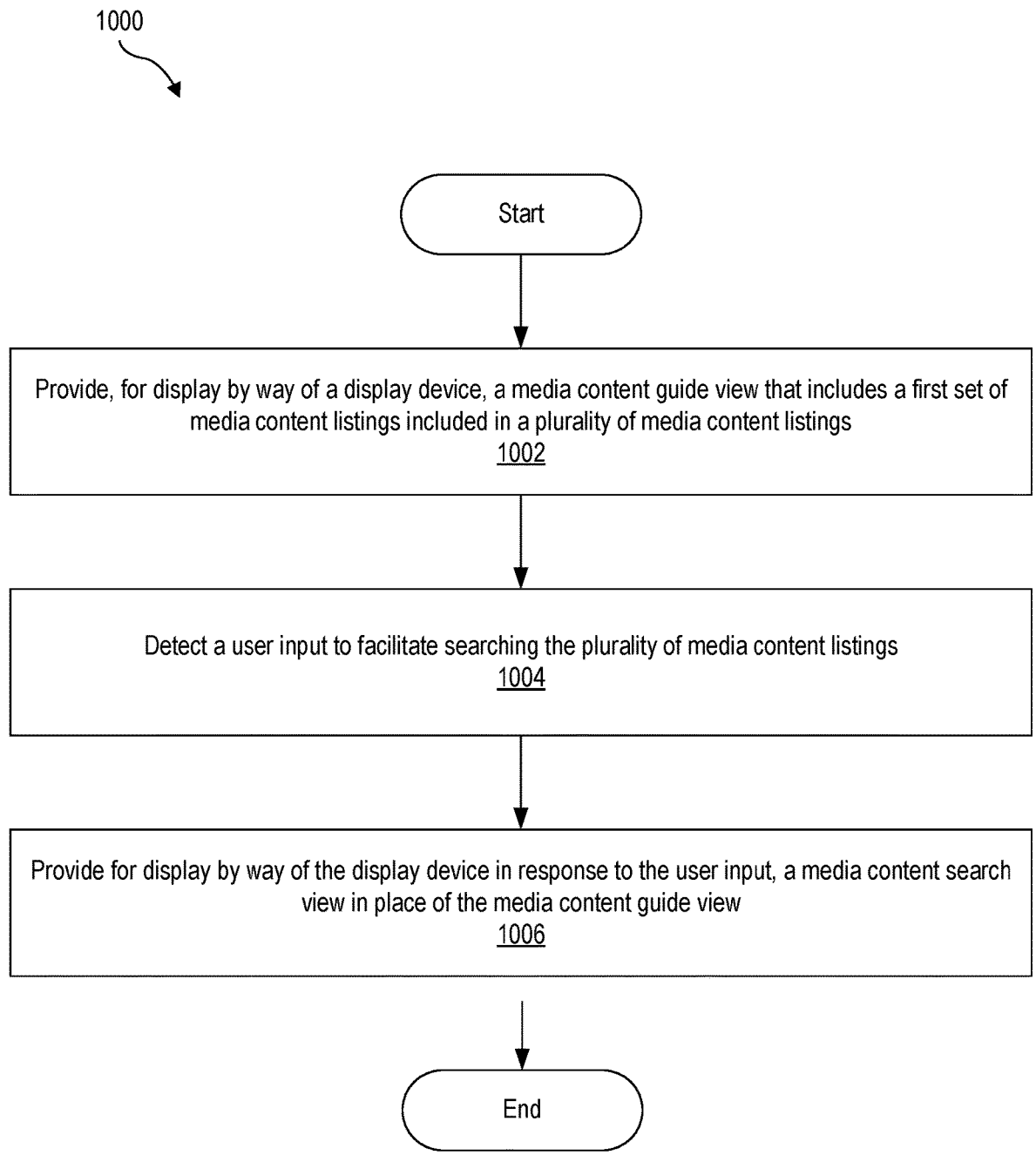

FIG. 10 illustrates another exemplary method for facilitating navigation of a media content guide. While FIG. 10 illustrates exemplary operations according to one embodiment, other embodiments may omit, add to, reorder, and/or modify any of the operations shown in FIG. 10. One or more of the operations shown in FIG. 10 may be performed by system 100, any components included therein, and/or any implementation thereof.

In operation 1002, a media content system (e.g., media content system 100) may provide for display by way of a display device, a media content guide view that includes a first set of media content listings included in a plurality of media content listings. Operation 1002 may be performed in any of the ways described herein.

In operation 1004, the media content system may detect a user input to facilitate searching the plurality of media content listings. Operation 1004 may be performed in any of the ways described herein.

In operation 1006, the media content system may provide for display by way of the display device in response to the user input, a media content search view in place of the media content guide view. Operation 1006 may be performed in any of the ways described herein. As described herein, the media content guide view may include a media content guide pane including a second set of media content listings included in the plurality of media content listings; a first media content search pane including a set of media categories from which a media category is configured to be selected by a user and used by the media content system to select, from the plurality of media content listings, an additional set of media content listings associated with the media category for presentation in the media content guide pane; and a second media content search pane including a set of filter options from which a filter parameter is configured to be selected by the user and used by the media content system to select a filtered set of media content listings for presentation in the media content guide pane.

In certain examples, the media content guide pane is navigable in a first direction in the media content search view. In addition, selection of the media category in the first media content search pane causes faster navigation of the media content guide pane in the first direction than is available when the user navigates within the media content guide pane.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 11:
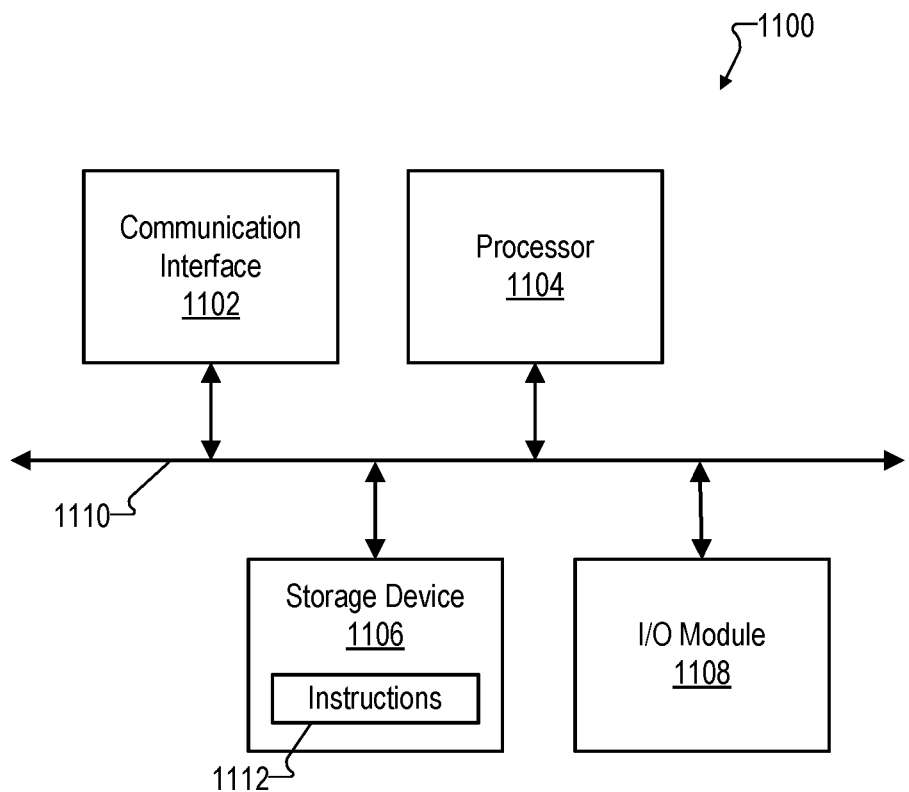
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected one to another via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data and/or interpreting, executing, and/or directing execution of one or more of the instructions, processes, and/or operations described herein. Processor 1104 may perform operations by executing computer-executable instructions 1112 (e.g., an application, software, code, and/or other executable data instance) stored in storage device 1106.

Storage device 1106 may include one or more data storage media, devices, or configurations and may employ any type, form, and combination of data storage media and/or device. For example, storage device 1106 may include, but is not limited to, any combination of the non-volatile media and/or volatile media described herein. Electronic data, including data described herein, may be temporarily and/or permanently stored in storage device 1106. For example, data representative of computer-executable instructions 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1100. For example, memory 102 may be implemented by storage device 1106, and processor 104 may be implemented by processor 1104.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
providing, by a media content system for display in a media content search view, a media content guide pane including a portion of media content listings from a plurality of media content listings;
providing, by the media content system for concurrent display with the media content guide pane in the media content search view, a first media content search pane including a set of media categories from which a media category is configured to be selected by a user and used by the media content system to select, from the plurality of media content listings, a set of media content listings associated with the media category for presentation in the media content guide pane;
providing, by the media content system for concurrent display with the media content guide pane and the first media content search pane in the media content search view, a second media content search pane including a set of filter options from which a filter parameter is configured to be selected by the user and used by the media content system to select a filtered set of media content listings for presentation in the media content guide pane; and
providing, by the media content system for concurrent display with the media content guide pane, the first media content search pane, and the second media content search pane in the media content search view, a third media content search pane that includes an additional set of filter options from which an additional filter parameter is configured to be selected by the user and used by the media content system to select an additional filtered set of media content listings for presentation in the media content guide pane, the additional set of filter options being relatively more narrow than the set of filter options in the second media content search pane;
wherein
the media content guide pane is navigable in a first direction in the media content search view,
the portion of media content listings included in the media content guide pane are arranged along a horizontal time axis and a vertical channel axis,
the first media content search pane, the second media content search pane, and the third media content search pane are each provided to the left of and do not overlap the media content guide pane,
selection of the media category in the first media content search pane causes faster navigation of the media content guide pane in the first direction than is available when the user navigates within the media content guide pane,
the media content search view further includes a selector window provided for concurrent display with the media content guide pane, the first media content search pane, and the second media content search pane in the media content search view, and
the selector window is configured to move from a media content listing represented in the media content guide pane to the first media content search pane in response to a left directional arrow user input on a remote control device, is further configured to move from the first media content search pane to the second media content search pane in response to a repeated entry of the left directional arrow user input, and is further configured to move from the second media content search pane to the third media content search pane in response to an additional repeated entry of the left directional arrow user input.

2. The method of claim 1, further comprising:
detecting, by the media content system, a user selection of the media category; and
updating, by the media content system based on the user selection of the media category, the media content guide pane to include at least some media content listings included in the set of media content listings.

3. The method of claim 2, wherein:
a channel is displayed along the vertical channel axis for each media content listing included in the media content guide pane; and
the updating of the media content guide pane to include the at least some media content listings included in the set of media content listings comprises shifting channels displayed along the channel axis in the first direction to a block of channels associated with the media category.

4. The method of claim 1, further comprising:
detecting, by the media content system, a user selection of the filter parameter; and
filtering, by the media content system based on the user selection of the filter parameter, the plurality of media content listings.

5. The method of claim 4, further comprising updating the media content guide pane to include at least some media content listings included in the filtered set of media content listings.

6. The method of claim 1, wherein the filtered set of media content listings comprises the set of media content listings associated with the media category as filtered based on the filter parameter.

7. The method of claim 1, wherein the portion of media content listings in the media content guide pane, the set of media categories in the first media content search pane, and the filter options in the second media content search pane are scrollable with respect to a common axis in the media content search view.

8. The method of claim 7, wherein the common axis extends horizontally within the media content search view and bisects the media content guide pane, the first media content search pane, and the second media content search pane.

9. The method of claim 1, wherein:
the media content guide pane, the first media content search pane, and the second media content search pane are provided horizontally adjacent to one another in the media content search view; and
the first media content search pane is provided between the second media content search pane and the media content guide pane.

10. A method comprising:
providing, by a media content system for display by way of a display device, a media content guide view that includes a first set of media content listings included in a plurality of media content listings;
detecting, by the media content system, a left directional arrow user input on a remote control device to facilitate searching the plurality of media content listings; and
providing, by the media content system for display by way of the display device in response to the user input, a media content search view in place of the media content guide view, the media content search view including:
a media content guide pane including a second set of media content listings included in the plurality of media content listings;
a first media content search pane including a set of media categories from which a media category is configured to be selected by a user and used by the media content system to select, from the plurality of media content listings, an additional set of media content listings associated with the media category for presentation in the media content guide pane;
a second media content search pane including a set of filter options from which a filter parameter is configured to be selected by the user and used by the media content system to select a filtered set of media content listings for presentation in the media content guide pane;
a third media content search pane including an additional set of filter options from which an additional filter parameter is configured to be selected by the user and used by the media content system to select an additional filtered set of media content listings for presentation in the media content guide pane, the additional set of filter options being relatively more narrow than the set of filter options in the second media content search pane; and
a selector window provided for concurrent display with the media content guide pane, the first media content search pane, and the second media content search pane in the media content search view,
wherein
the media content guide pane is navigable in a first direction in the media content search view,
the second set of media content listings included in the media content guide pane are arranged along a horizontal time axis and a vertical channel axis,
the first media content search pane, the second media content search pane, and the third media content search pane are each provided to the left of and do not overlap the media content guide pane,
selection of the media category in the first media content search pane causes faster navigation of the media content guide pane in the first direction than is available when the user navigates within the media content guide pane, and
the selector window is configured to move from a media content listing represented in the media content guide pane to the first media content search pane in response to the left directional arrow user input, is further configured to move from the first media content search pane to the second media content search pane in response to a repeated entry of the left directional arrow user input, and is further configured to move from the second media content search pane to the third media content search pane in response to an additional repeated entry of the left directional arrow user input.

11. The method of claim 10, wherein the first set of media content listings and the second set of media content listings include the same media content listings.

12. The method of claim 10, wherein the first set of media content listings in the media content guide view and the second set of media content listings in media content guide pane of the media content search view are arranged along a time axis and a channel axis.

13. The method of claim 10, wherein the providing of the media content search view in place of the media content guide view includes shifting the first set of media content listings in a second direction within a graphical user interface displayed by the display device to form the media content guide pane and make room for the first media content search pane and the second media content search pane.

14. The method of claim 10, further comprising:
detecting, by the media content system, the repeated entry of the left directional arrow user input while the selector window is provided in the first media content search pane; and
providing, by the media content system based on the repeated entry of the left directional arrow user input, the selector window in the second media content search pane instead of the first media content search pane.

15. A system comprising:
a memory that stores instructions; and
a processor communicatively coupled to the memory and configured to execute the instructions to:
provide a media content search view for display by a display device, the media content search view including:
a media content guide pane including a portion of media content listings from a plurality of media content listings;
a first media content search pane including a set of media categories from which a media category is configured to be selected by a user and used by the system to select, from the plurality of media content listings, a set of media content listings associated with the media category for presentation in the media content guide pane;
a second media content search pane including a set of filter options from which a filter parameter is configured to be selected by the user and used by the system to select a filtered set of media content listings for presentation in the media content guide pane; and
a third media content search pane including an additional set of filter options from which an additional filter parameter is configured to be selected by the user and used by the media content system to select an additional filtered set of media content listings for presentation in the media content guide pane, the additional set of filter options being relatively more narrow than the set of filter options in the second media content search pane, wherein
- the media content guide pane is navigable in a first direction in the media content search view,
- the portion of media content listings included in the media content guide pane are arranged along a horizontal time axis and a vertical channel axis,
- the first media content search pane, the second media content search pane, and the third media content search pane are each provided to the left of and do not overlap the media content guide pane,
- selection of the media category in the first media content search pane causes faster navigation of the media content guide pane in the first direction than is available when the user navigates within the media content guide pane,
- the media content search view further includes a selector window provided for concurrent display with the media content guide pane, the first media content search pane, and the second media content search pane in the media content search view, and
- the selector window is configured to move from a media content listing represented in the media content guide pane to the first media content search pane in response to a left directional arrow user input on a remote control device, is further configured to move from the first media content search pane to the second media content search pane in response to a repeated entry of the left directional arrow user input, and is further configured to move from the second media content search pane to the third media content search pane in response to an additional repeated entry of the left directional arrow user input.

16. The system of claim 15, wherein the processor is further configured to:
- detect the repeated entry of the left directional arrow user input while the selector window is provided for display in the first media content search pane; and
- provide, based on the repeated entry of the left directional arrow user input, the selector window for display in the second media content search pane instead of the first media content search pane.

17. The method of claim 1, wherein:
- the selector window is navigable along a single axis of the first media content search pane when moved within the first media content search pane; and
- the selector window is navigable along an additional single axis of the second media content search pane when moved within the second media content search pane.

18. The method of claim 17, wherein the single axis and the additional single axis are each oriented vertically within the media content search view.

19. The method of claim 17, wherein the single axis and the additional single axis are parallel to one another.

* * * * *